United States Patent
Jiang et al.

(10) Patent No.: US 10,616,214 B1
(45) Date of Patent: Apr. 7, 2020

(54) SYSTEMS AND METHODS FOR PREVENTING LOSS OF POSSESSION FACTORS

(71) Applicant: Symantec Corporation, Mountain View, CA (US)

(72) Inventors: Kevin Jiang, San Mateo, CA (US); Ilya Sokolov, Boston, MA (US)

(73) Assignee: NortonLifeLock Inc., Tempe, AZ (US)

( * ) Notice: Subject to any disclaimer, the term of this patent is extended or adjusted under 35 U.S.C. 154(b) by 199 days.

(21) Appl. No.: 15/346,748

(22) Filed: Nov. 9, 2016

(51) Int. Cl.
*H04L 29/06* (2006.01)
*H04W 12/06* (2009.01)

(52) U.S. Cl.
CPC ........ *H04L 63/0853* (2013.01); *H04L 63/083* (2013.01); *H04W 12/06* (2013.01); *H04L 2463/082* (2013.01)

(58) Field of Classification Search
CPC . A63F 9/24; G06F 21/00; G06F 21/31; G06F 21/40; H04M 1/66; H04L 63/0853; H04L 63/083; H04L 9/32; H04W 12/06; G06Q 20/347; G06Q 20/3674; G06Q 20/385
USPC ............. 463/17; 726/21, 5, 7; 455/411, 410; 705/67
See application file for complete search history.

(56) References Cited

U.S. PATENT DOCUMENTS

| | | | |
|---|---|---|---|
| 8,649,766 B2 * | 2/2014 | Kemshall | G06F 21/40 455/410 |
| 8,959,588 B1 | 2/2015 | Vijayan et al. | |
| 9,706,406 B1 * | 7/2017 | Adams | H04W 12/08 |
| 2005/0153685 A1 * | 7/2005 | Choi | H04M 1/66 455/411 |
| 2008/0096628 A1 * | 4/2008 | Czyzewski | G07F 17/32 463/17 |
| 2008/0216172 A1 * | 9/2008 | Forman | G06F 21/33 726/21 |
| 2008/0249947 A1 * | 10/2008 | Potter | G06F 21/31 705/67 |
| 2012/0196571 A1 * | 8/2012 | Grkov | H04L 63/14 455/411 |

OTHER PUBLICATIONS

Google 2-Step Verification; https://www.google.com/landing/2step/; Nov. 16, 2016.

(Continued)

*Primary Examiner* — Thanhnga B Truong
(74) *Attorney, Agent, or Firm* — FisherBroyles, LLP (57) ABSTRACT

The disclosed computer-implemented method for preventing loss of possession factors may include (i) identifying an account of a user that is associated with a possession factor that is used by the user to perform a multi-factor authentication procedure that is required when accessing the account of the user, (ii) monitoring one or more attributes of at least one of the user and the possession factor, (iii) determining, based at least in part on the one or more attributes of at least one of the user and the possession factor, that the possession factor has likely been lost, and (iv) performing a security action in response to determining that the possession factor has likely been lost to prevent the user from being unable to perform the multi-factor authentication procedure. Various other methods, systems, and computer-readable media are also disclosed.

20 Claims, 6 Drawing Sheets

(56) References Cited

OTHER PUBLICATIONS

Jiang et al., "Systems and Methods for Detecting Cloning of Security Tokens", U.S. Appl. No. 15/346,752 dated Nov. 9, 2016, 62 pages.
Han et al., "Systems and Methods for Evaluating Infection Risks Based on Profiled User Behaviors", U.S. Appl. No. 15/188,956 dated Jun. 21, 2016, 69 pages.

\* cited by examiner

SYSTEMS AND METHODS FOR PREVENTING LOSS OF POSSESSION FACTORS

BACKGROUND

Various methods are used to control users' access to systems, information, and network resources. In general, a typical access-control system performs two primary functions: an authentication function and an authorization function. For example, prior to providing a user access to a resource (e.g., a computing device, an application, or a website) an access-control system may first request authentication-factor information (e.g., a username, a password, a one-time-use password, etc.) from the user that the access-control system can use to positively identify the user. If the identity of the user can be established using the provided authentication-factor information, the access-control system may then determine whether the user has permission to access the resource and, if so, may allow the user to access the resource.

The level of security provided by an access-control system may be affected by the type and quantity of authentication factors that a user must have to be authenticated. Examples of authentication factors that a user may need to be authenticated may include knowledge factors that the user knows (e.g., a username, a password, or a personal identification number), possession factors that the user possesses (e.g., a smartcard or a hardware token or smartphone that generates one-time-use passwords), and inherence factors that are part of the user (e.g., a biometric characteristic of the user such as a fingerprint). To increase the level of security provided by its access-control systems, many enterprises implement access-control systems that authenticate users using an authentication method, commonly referred to as multi-factor (or two-factor) authentication, that uses two or more types of authentication factors (e.g., both knowledge factors and possession factors).

While multi-factor authentication generally provides greater levels of security, various issues may arise when typical multi-factor authentication methods are implemented. One of the biggest issues that may arise when typical multi-factor authentication methods are implemented is that, if a user loses a possession factor, the user may be unable to be authenticated. Moreover, the user may have limited options for recovering access to his or her accounts that required authentication. In general, standard techniques for resetting knowledge factors, such as resetting via email or other knowledge-factor based authentication techniques, cannot be used to reset possession factor since using these methods may defeat the purpose of requiring a possession factor in the first place. Some access-control systems may attempt to solve the problem of possession-factor loss by requiring that each user maintains multiple possession factors so that if one possession factor is lost, then one of the others can be used. Unfortunately, this solution may also fail when a user loses all possession factors. The instant disclosure, therefore, identifies and addresses a need for systems and methods for preventing loss of possession factors.

SUMMARY

As will be described in greater detail below, the instant disclosure describes various systems and methods for preventing loss of possession factors. In one example, a method for preventing loss of possession factors may include (i) identifying an account of a user that is associated with a possession factor that is used by the user to perform a multi-factor authentication procedure that is required when accessing the account of the user, (ii) monitoring one or more attributes of the user and/or the possession factor, (iii) determining, based at least in part on the one or more attributes of the user and/or the possession factor, that the possession factor has likely been lost, and (iv) performing a security action in response to determining that the possession factor has likely been lost to prevent the user from being unable to perform the multi-factor authentication procedure.

In some examples, the account of the user may be associated with an additional possession factor, and either one of the possession factor and the additional possession factor may be used by the user to perform the multi-factor authentication procedure. In such examples, the security action may prevent the possession factor and the additional possession factor from becoming simultaneously lost. In at least one example, the step of performing the security action may include (i) notifying the user of the possession factor having been lost and (ii) instructing the user to access the account of the user using the additional possession factor and register a backup possession factor to replace the possession factor that has likely been lost. In various examples, the possession factor and/or the additional possession factor may be a mobile phone, a hardware token, or a software token.

In some examples, the possession factor may include a mobile phone that was initially associated with an initial phone number. In such examples, the step of monitoring the one or more attributes may include monitoring, as part of an application installed on the mobile phone, a current phone number that may be currently associated with the mobile phone, and the step of determining that the possession factor has likely been lost may include detecting that the current phone number may not be the same as the initial phone number.

In some examples, the possession factor may include a mobile phone that was initially associated with a phone number. In one example, the step of monitoring the one or more attributes may include monitoring, as part of an application installed on the mobile phone, a location of the mobile phone, and the step of determining that the possession factor has likely been lost may include detecting a change in the location of the mobile phone that indicates that a cellular service associated with the phone number has likely been lost. Additionally or alternatively, the step of monitoring the one or more attributes may include monitoring a physical address of the user, and the step of determining that the possession factor has likely been lost may include detecting a change in the physical address of the user that indicates that a cellular service associated with the phone number has likely been lost. In other examples, the step of monitoring the one or more attributes may include monitoring a service status of the phone number, and the step of determining that the possession factor has likely been lost may include determining that the service status of the phone number indicates that the phone number has likely been lost.

In some examples, the possession factor may include a software token that was initially installed on a mobile device. In at least one example, the step of monitoring the one or more attributes may include monitoring, as part of an application installed on the mobile device, whether the software token is still installed on the mobile device, and the step of determining that the possession factor has likely been lost may include determining that the software token is no longer installed on the mobile device. In such examples, the step of monitoring the one or more attributes may include monitoring whether the software token is still installed on the mobile device by periodically sending push notifications to the software token, and the step of determining that the possession factor has likely been lost may include determining that the software token is no longer responding to the push notifications.

In some examples, the step of monitoring the one or more attributes may include monitoring a time period since the user last used the possession factor, and the step of determining that the possession factor has likely been lost may include determining that the time period has exceeded a predetermined threshold. In at least one example, the step of determining that the possession factor has likely been lost may include (i) using the one or more attributes of the user and/or the possession factor to predict a loss score for the possession factor and (ii) determining that the loss score for the possession factor has exceeded a predetermined threshold. In some examples, the step of performing the security action may include immediately notifying the user of the possession factor having been lost.

In one embodiment, a system for preventing loss of possession factors may include several modules stored in memory, including (i) an identifying module that identifies an account of a user that is associated with a possession factor that is used by the user to perform a multi-factor authentication procedure that is required when accessing the account of the user, (ii) a monitoring module that monitors one or more attributes of the user and/or the possession factor, (iii) a determining module that determines, based at least in part on the one or more attributes of the user and/or the possession factor, that the possession factor has likely been lost, (iv) a security module that performs a security action in response to determining that the possession factor has likely been lost to prevent the user from being unable to perform the multi-factor authentication procedure, and (v) at least one physical processor that executes the identifying module, the monitoring module, the determining module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an account of a user that is associated with a possession factor that is used by the user to perform a multi-factor authentication procedure that is required when accessing the account of the user, (ii) monitor one or more attributes of the user and/or the possession factor, (iii) determine, based at least in part on the one or more attributes of the user and/or the possession factor, that the possession factor has likely been lost, and (iv) perform a security action in response to determining that the possession factor has likely been lost to prevent the user from being unable to perform the multi-factor authentication procedure.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for preventing loss of possession factors. As will be explained in greater detail below, by monitoring various attributes of a user and/or one of the user's possession factors for changes that may indicate that the possession factor has become lost (or otherwise unavailable to the user), these systems and methods may ensure that the user is timely notified of the loss of the possession factor so that the user is not surprised when the user attempts to access an account that requires authentication using the possession factor. Furthermore, in some examples, by timely notifying a user of the loss of one of two or more of the user's possession factors, these systems and methods may enable the user to use an available possession factor to register a replacement possession factor such that the user always has two or more possession factors and will not lose the ability to authenticate.

In addition, the systems and methods described herein may improve the functioning of a computing device by detecting when the computing device is unable to be used to perform an authentication procedure and enabling the computing device to be brought back to a usable state. These systems and methods may also improve the field of multi-factor authentication by enabling lost possession factors to be timely detected and replaced. Embodiments of the instant disclosure may also provide various other advantages and features, as discussed in greater detail below.

Figure 1:
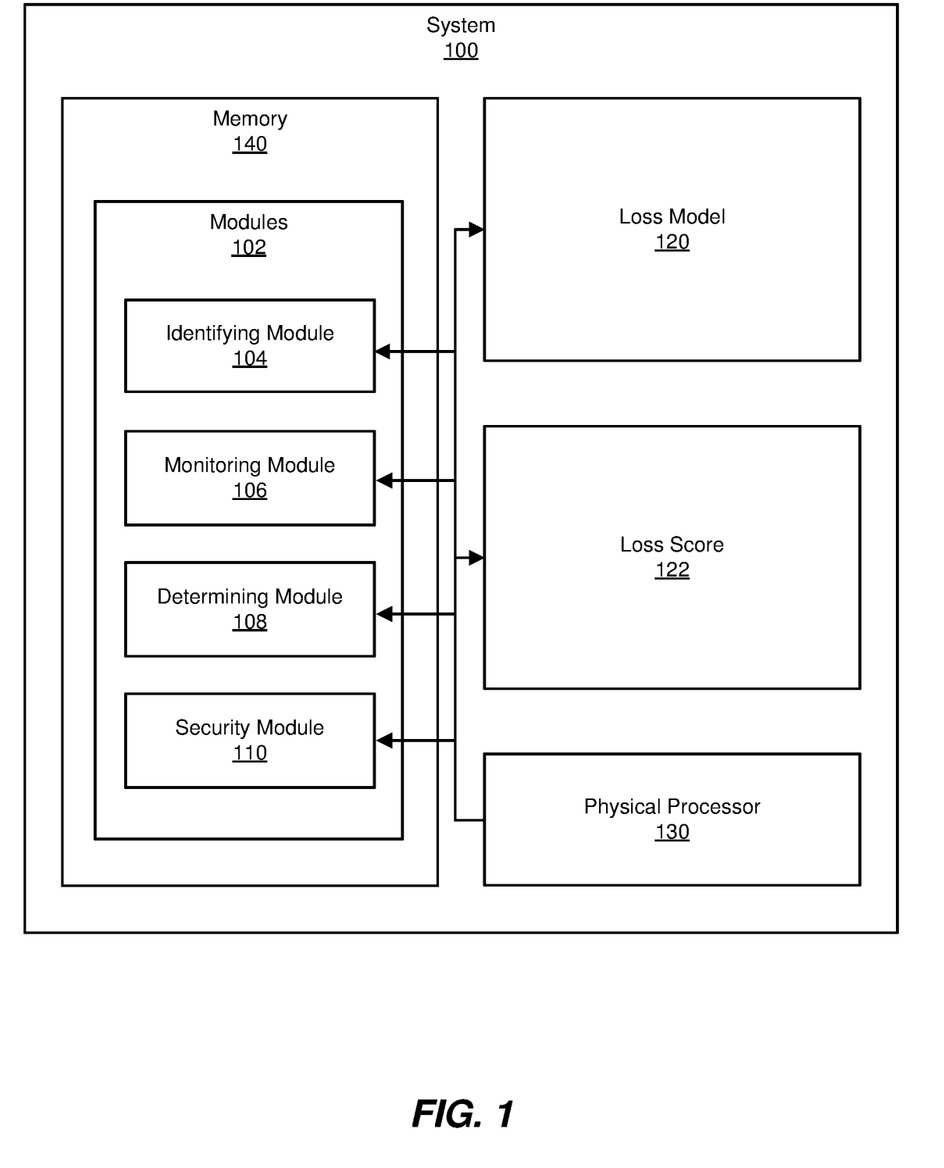
FIG. 1 is a block diagram of an example system for preventing loss of possession factors.
Figure 2:
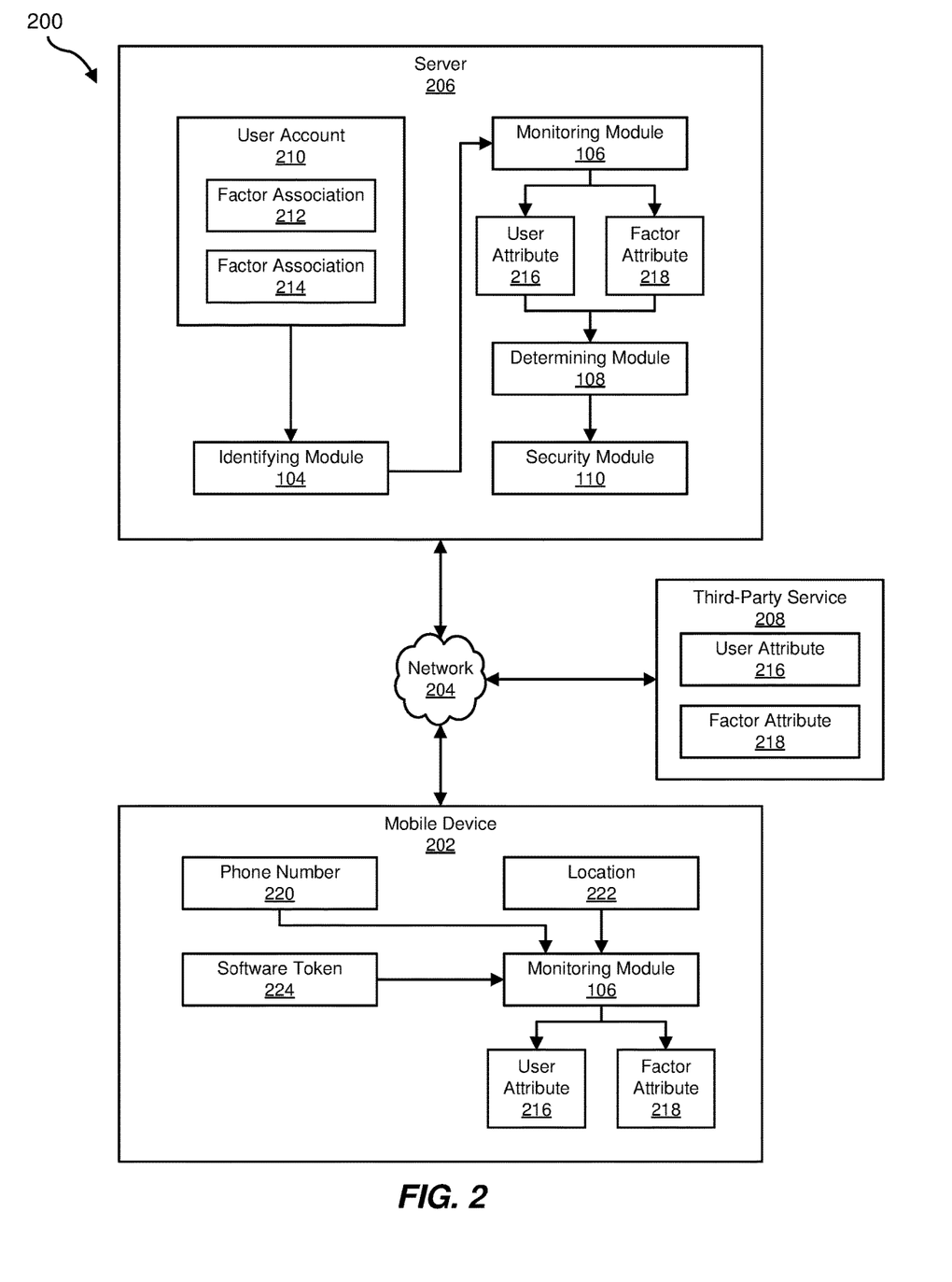
FIG. 2 is a block diagram of an additional example system for preventing loss of possession factors.

The following will provide, with reference to FIGS. 1-2, detailed descriptions of example systems for preventing loss of possession factors. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of an example system 100 for preventing loss of possession factors. As illustrated in this figure, example system 100 may include one or more modules 102 for performing one or more tasks. As will be explained in greater detail below, modules 102 may include an identifying module 104, a monitoring module 106, a determining module 108, and a security module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., mobile device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate preventing loss of possession factors. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more loss models, such as loss model 120, and one or more loss scores, such as loss score 122. Loss model 120 generally represents any type or form of algorithm, heuristic, data, or combination thereof, that may be used to model and/or predict the likelihood that a possession factor has been lost based on attributes of the possession factor and/or a user associated with the possession factor. In one example, loss model 120 may represent a classification model that is derived using any suitable machine learning techniques. Loss score 122 generally represents a predicted numerical likelihood or probability that an associated possession factor has been lost. In some examples, the systems and methods described herein may consider any possession factor with an associated loss score that is above a predetermined threshold value as lost or unavailable.

Example system 100 in FIG. 1 may be implemented in a variety of ways. For example, all or a portion of example system 100 may represent portions of example system 200 in FIG. 2. As shown in FIG. 2, system 200 may include a mobile device 202, a server 206, and a third-party service 208 in communication via a network 204. In one example, all or a portion of the functionality of modules 102 may be performed by mobile device 202, server 206, and/or any other suitable computing system. As will be described in greater detail below, one or more of modules 102 from FIG. 1 may, when executed by at least one processor of mobile device 202 and/or server 206, enable mobile device 202 and/or server 206 to prevent the loss of possession factors. For example, and as will be described in greater detail below, one or more of modules 102 may cause mobile device 202 and/or server 206 to (i) identify an account 210 of a user that may be associated with one or more possession factors (e.g., mobile device 202 and/or software token 224 installed on mobile device 202) that may be used by the user to perform a multi-factor authentication procedure that may be required when accessing account 210, (ii) monitor one or more attributes of the user (e.g., user attribute 216) and/or one or more attributes of the possession factors (e.g., factor attribute 218), (iii) determine, based at least in part on the one or more attributes of the user and/or the possession factor, that one of the possession factor has likely been lost, and (iv) perform a security action in response to determining that the possession factor has likely been lost to prevent the user from being unable to perform the multi-factor authentication procedure.

Mobile device 202 generally represents any type or form of computing device capable of reading computer-executable instructions. In some examples, mobile device 202 may represent a mobile phone or smartphone that is a possession factor or that hosts a possession factor (e.g., a software token). Additional examples of mobile device 202 include, without limitation, hardware tokens, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device. As shown in FIG. 2, mobile device 202 may be associated with a phone number 220 that may be used to make calls to mobile device 202 and/or send messages to mobile device 202. Mobile device 202 may also include location information (e.g., location 222) that may indicate a geographic location (e.g., Global-Positioning-System (GPS) coordinates) of mobile device 202.

As used herein, the term "possession factor" generally refers to any authentication factor that a user may possess and that may be used to perform an authentication procedure that authenticates the user. In some examples, a possession factor may be used to derive a security code, such as a one-time-use password, that may be provided by the user to an authentication system to verify that the user is in possession of the possession factor. For example, a mobile phone may be used to receive a text message that includes a security code that may be used to verify that a user is in possession of the mobile phone. In this example, a loss of the mobile phone, loss of cellular service, and/or other factors may result in the inability of the mobile phone to receive security codes. In other examples, a software token installed on a mobile device (e.g., a mobile phone or tablet) may be used to derive a security code that may be used to verify that the user is in possession of the software token. In this example, loss of the mobile device, deletion of the software token from the mobile device, and/or other factors may result in the inability of the software token to generate security codes.

Server 206 generally represents any type or form of computing device that is capable of reading computer-executable instructions. In some examples, server 206 may represent a portion of an authentication system. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Third-party service 208 generally represents any medium or architecture capable of providing access to user attributes or possession-factor attributes. In some examples, third-party service 208 may represent a portion of an application or a website through which user or possession-factor attributes may be queried.

Network 204 generally represents any medium or architecture that is capable of facilitating communication or data transfer. In one example, network 204 may facilitate communication between mobile device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
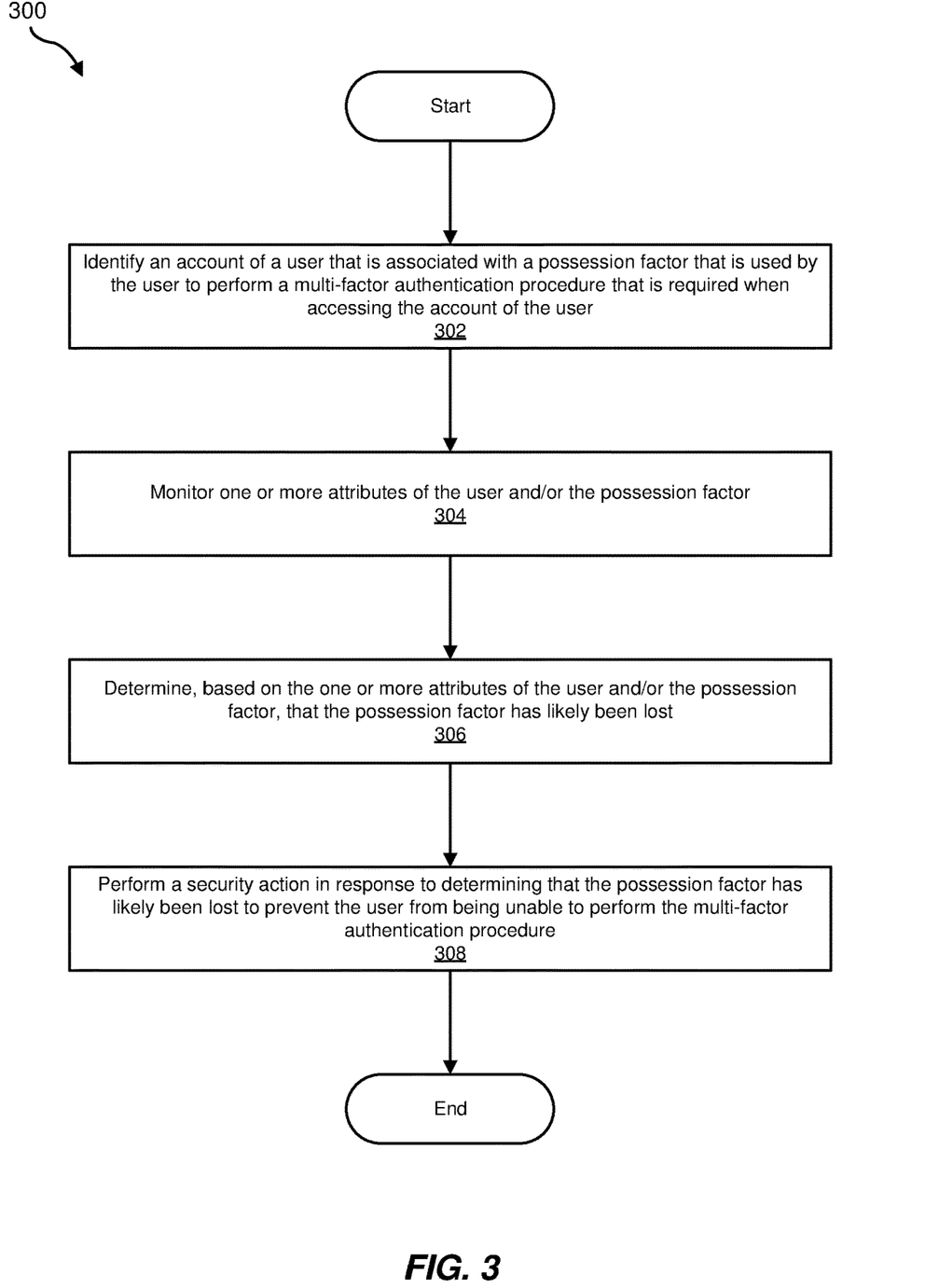
FIG. 3 is a flow diagram of an example method for preventing loss of possession factors.
Figure 4:
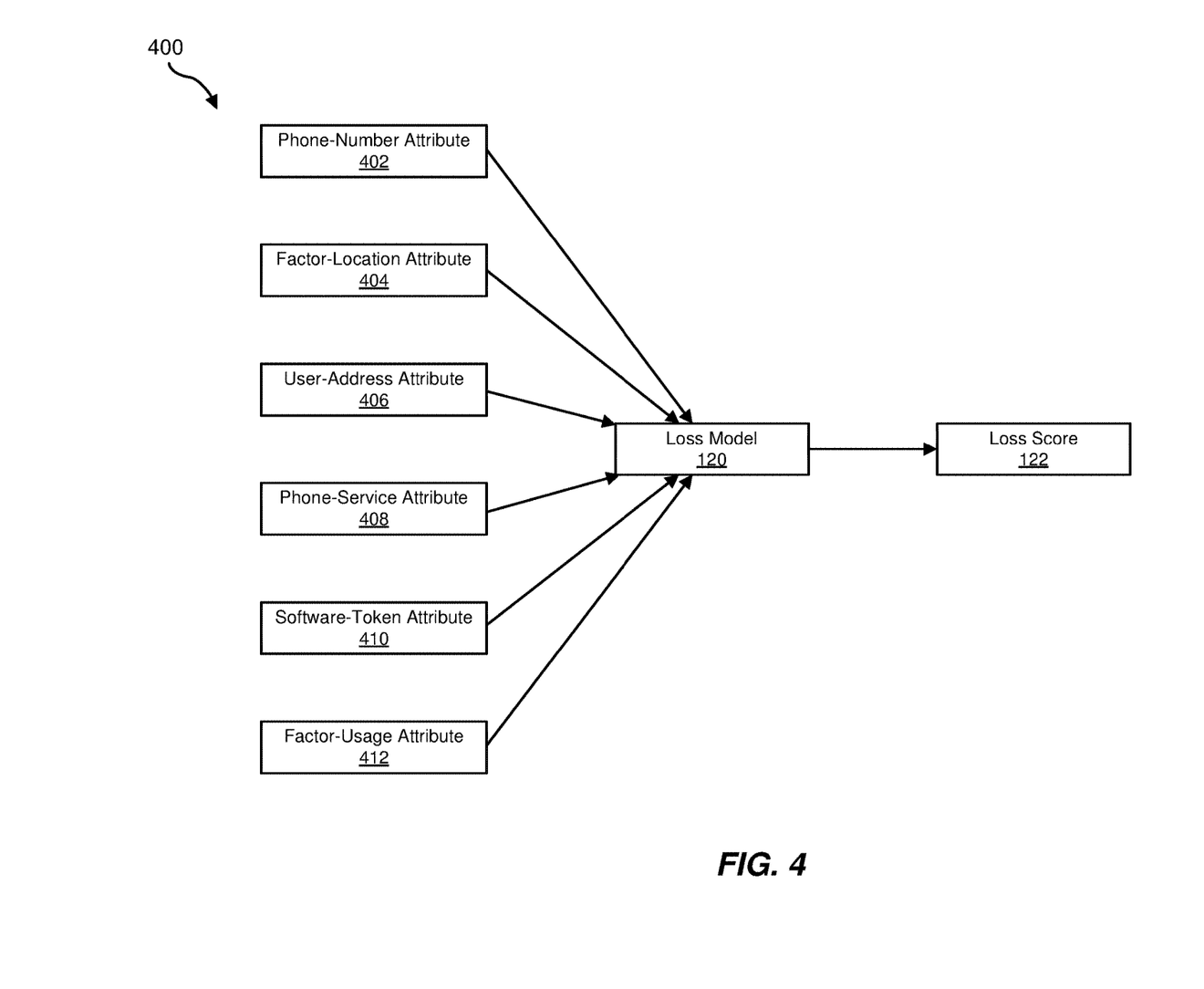
FIG. 4 is a flow diagram of an example method for calculating loss scores for possession factors.

FIG. 3 is a flow diagram of an example computer-implemented method 300 for preventing loss of possession factors. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify an account of a user that is associated with a possession factor that is used by the user to perform a multi-factor authentication procedure that is required when accessing the account of the user. For example, identifying module 104 may, as part of server 206 in FIG. 2, identify user account 210 that is associated with mobile device 202 and/or software token 224.

The systems described herein may identify user accounts in any suitable manner. In some examples, an account of a user may be associated with or include information that identifies one or more possession factors that may be used, in combination or independently, to authenticate the user. For example, user account 210 in FIG. 2 may include factor association 212 that may identify mobile device 202 and factor association 214 that may identify software token 224. In this example, either mobile device 202 or software token 224 may be used to authenticate the user associated with user account 210. In general, identifying module 104 may, as part of identifying an account of a user, use information associated with the user's account to identify the possession factors that are used to authenticate the user. For example, identifying module 104 may identify information (e.g., phone numbers or other identification numbers) associated with a user's account that identifies the possession factors that may be used to authenticate the user. In addition to identifying the possession factors that are associated with an account of a user, identifying module 104 may also identify information associated with the user's account (e.g., names, addresses, etc.) that identify the user.

At step 304, one or more of the systems described herein may monitor one or more attributes of the user and/or the possession factor. For example, monitoring module 106 may, as part of mobile device 202 and/or server 206 in FIG. 2, monitor user attribute 216 and factor attribute 218.

The systems described herein may monitor various attributes of users and/or possession factors for changes that may indicate that a possession factor has been lost such as changes to phone numbers, changes to addresses, changes to devices, changes to locations, changes to cellular-service availability, and changes in usage behaviors. For example, when a possession factor is or relies upon a mobile phone, monitoring module 106 may monitor any attributes of the mobile phone that may indicate, either alone or in combination, that the possession factor has become lost or unavailable to a user for the purpose of performing a multi-factor authentication procedure that is required when accessing an account of the user. In some circumstances, a user may have registered (e.g., with an authentication service) a phone number of a mobile phone of the user to which authentication information (e.g., one-time-use passwords) may be sent. In these circumstances, if the user changes the phone number that is associated with the mobile phone, the mobile phone may no longer be able to be used to receive the authentication information. For at least this reason, monitoring module 106 may monitor for changes to the phone number that is associated with the mobile phone and/or the phone number that is associated with the user. In some examples, monitoring module 106 may monitor for changes to a mobile phone's phone number as part of an application installed on the mobile phone. For example, monitoring module 106 may, as part of mobile device 202, periodically check phone number 220. Additionally or alternatively, monitoring module 106 may monitor for changes to the phone number that is associated with a mobile phone or a user by querying a partner cellular-service provider for information that may indicate that the phone number of the mobile phone or the user has changed. For example, monitoring module 106 may, as part of server 206, query third-party service 208 (e.g., a cellular service provider) for the phone number associated with mobile device 202.

In some circumstances, a user may terminate the cellular service that is associated with a phone number, or the cellular service that is associated with the phone number may be lost. The cellular service that is associated with a phone number may be lost as a result of a variety of factors such as a failure of the cellular service, a termination of cellular service by a cellular-service provider, or the user taking the mobile phone outside of the coverage area of the cellular service. In these circumstances, if the cellular service that is associated with a phone number is lost or terminated, the mobile phone associated with the phone number may no longer be able to be used to receive authentication information. In these circumstances, monitoring module 106 may monitor for changes to cellular-service availability. In at least one example, monitoring module 106 may monitor for changes to cellular-service availability by querying a partner cellular-service provider for information that may indicate that cellular service associated with a phone number of a mobile phone has been lost or terminated. In another example, monitoring module 106 may monitor for changes to cellular-service availability as part of an application installed on the mobile phone. Additionally or alternatively, monitoring module 106 may monitor for changes to cellular service availability by monitoring the location of a mobile phone associated with a phone number. In at least one example, monitoring module 106 may monitor the location of the mobile phone as part of an application installed on the mobile device.

In some circumstances, attributes of a user may indicate that the cellular service associated with a phone number is unavailable. For example, a user may lose the cellular service associated with a phone number when the user changes residences. As such, monitoring module 106 may monitor for changes to cellular service availability by monitoring a physical address (e.g., a mailing address) of the user. In at least one example, monitoring module 106 may monitor the physical address of the user by querying a partner service for information that may indicate that the physical address of the user has changed.

In some examples, a possession factor may be a software token that has been installed on a mobile device and that generates authentication information. In these examples, if the user uninstalls the software token or the user obtains a new mobile device and does not reinstall the software token to the new mobile device, the user may lose the ability to receive authentication information via the software token. In at least one example, monitoring module 106 may monitor, as part of an application installed on the mobile device, whether the software token is installed on the mobile device. In some examples, monitoring module 106 may monitor whether the software token is still installed on the mobile device by periodically sending, from a remote server, push notifications to the software token and noting whether the software token responds to the push notifications. In at least one example, monitoring module 106 may monitor, as part of an application installed on the mobile device, whether a user changes or upgrades their mobile device. In some examples, the time period since a user last used a possession factor may indicate whether the possession factor has been lost. For at least this reason, monitoring module 106 may monitor the time period since a user last used a possession factor.

At step 306, one or more of the systems described herein may determine, based at least in part on the one or more attributes of the user and/or the possession factor, that the possession factor has likely been lost. For example, determining module 108 may, as part of server 206 in FIG. 2, determine that mobile device 202 and/or software token 224 has likely been lost.

The systems described herein may determine that a possession factor has likely been lost in any suitable manner. In general, determining module 108 may determine whether or not a possession factor has been lost by detecting changes to attributes of a user of the possession factor and/or attributes of the possession factor that may indicate that the possession factor has been lost such as changes to phone numbers, changes to addresses, changes to devices, changes to locations, changes to cellular-service availability, and changes in usage behaviors. For example, determining module 108 may determine that a mobile phone has likely been lost (e.g., for the purpose of authenticating a user) by determining that the mobile phone's phone number has changed. In another example, determining module 108 may determine that a mobile phone has likely been lost by determining that the cellular service associated with the mobile phone or the mobile phone's phone number has been terminated or has become unavailable. Determining module 108 may determine that the cellular service associated with the mobile phone or the mobile phone's phone number has been terminated or has become unavailable by detecting a failure of the cellular service, by detecting a termination of cellular service by a cellular-service provider, or by detecting when the user has taken the mobile phone outside of the coverage area of the cellular service.

In some examples, determining module 108 may determine that a user has likely taken a mobile phone outside of the coverage area of a cellular service by detecting a change in the location of a mobile phone that may indicate as much. For example, determining module 108 may determine that a user has likely taken a mobile phone outside of the coverage area of a cellular service by detecting when the user travels outside of his or her country. Additionally or alternatively, determining module 108 may determine that a user has likely taken a mobile phone outside of the coverage area of a cellular service by detecting a change to the physical address (e.g., a mailing address) of the user. For example, determining module 108 may determine that a user has likely taken a mobile phone outside of the coverage area of a cellular service by detecting when the user's new address is not within the coverage area of a cellular service.

As mentioned above, a possession factor may be a software token that has been installed on a mobile device and that generates authentication information. In these examples, determining module 108 may determine that the software token has likely been lost (e.g., for the purpose of authenticating a user) by determining that the user has uninstalled the software token or by determining that the user has obtain a new mobile device and has not reinstalled the software token to the new mobile device.

In some examples, determining module 108 may determine that a possession factor has likely been lost based on changes to two or more attributes of a possession factor or a user of the possession factor. For example, determining module 108 may determine that a possession factor has likely been lost by (i) using the two or more attributes of the user and/or the possession factor to predict a loss score for the possession factor and (ii) determining that the loss score for the possession factor has exceeded a predetermined threshold. In some examples, determining module 108 may use the two or more attributes of the user and/or the possession factor to predict a loss score for the possession factor by (1) calculating a loss score for the possession factor using a linear combination of the two or more attributes. Using FIG. 4 as an example, determining module 108 may calculate a loss score 122 for a possession factor using a linear combination of phone-number attribute 402, factor-location attribute 404, user-address attribute 406, phone-service attribute 408, software-token attribute 410, and/or factor-usage attribute 412.

At step 308, one or more of the systems described herein may perform a security action in response to determining that the possession factor has likely been lost to prevent the user from being unable to perform the multi-factor authentication procedure. For example, security module 110 may, as part of server 206 in FIG. 2, perform a security action in response to determining that mobile device 202 or software token 224 has likely been lost to prevent the user associated with user account 210 from being unable to perform a multi-factor authentication procedure.

The systems described herein may perform step 308 in any suitable manner. In some examples, security module 110 may notify a user when a possession factor of the user has become lost or unavailable to the user to prevent the user from being unable to authenticate when attempting to access an account of the user and/or to provide the user with time to acquire or configure a replacement or backup possession factor. In some examples, a user may independently use one of several possible possession factors to perform an authentication procedure when accessing the user's account. In these examples, loss of one of the possession factors may not result in the user being unable to access the user's account. However, if all of the possession factors are simultaneously lost, the user may be unable to access the user's account. For at least this reason, security module 110 may, in response to a determination that one of the possession factors has likely been lost, perform a security action to prevent all of the possession factors from being simultaneously lost. In one example, security module 110 may prevent all of a user's possession factors from being simultaneously lost by notifying the user when one of the possession factors has been lost and instructing the user to access an account of the user using an available possession factor to register a backup possession factor. Upon completion of step 308, exemplary method 300 in FIG. 3 may terminate.

As explained above, by monitoring various attributes of a user and/or one of the user's possession factors that may indicate that the possession factor has become lost (or otherwise unavailable to the user), these systems and methods may ensure that the user is timely notified of the loss of the possession factor so that the user is not surprised when the user attempts to access an account that requires authentication using the possession factor. Furthermore, in some examples, by timely notifying a user of the loss of one of two or more of the user's possession factors, these systems and methods may enable the user to use an available possession factor to register a replacement possession factor such that the user always has two or more possession factors and will not lose the ability to authenticate.

Figure 5:
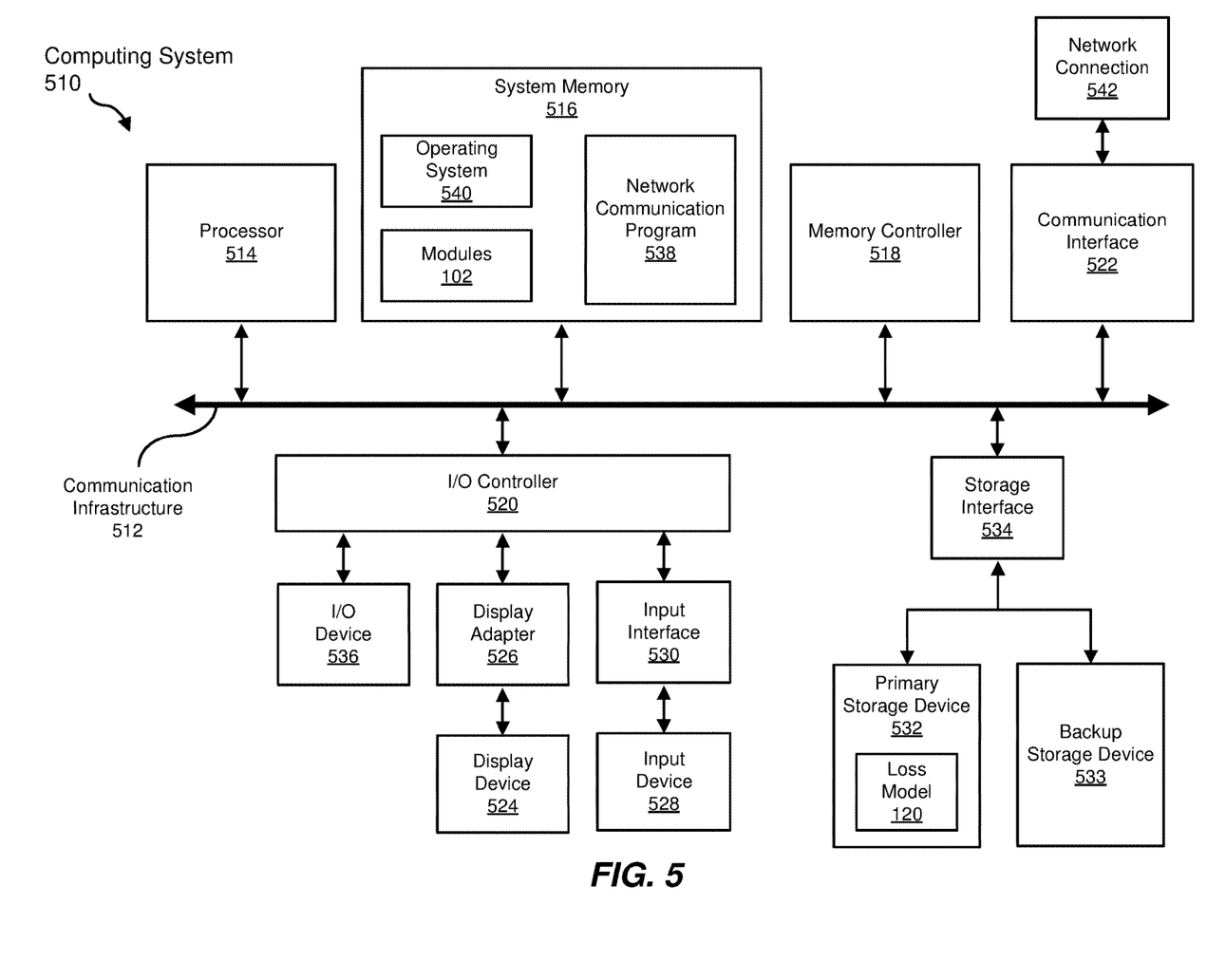
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, loss model 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
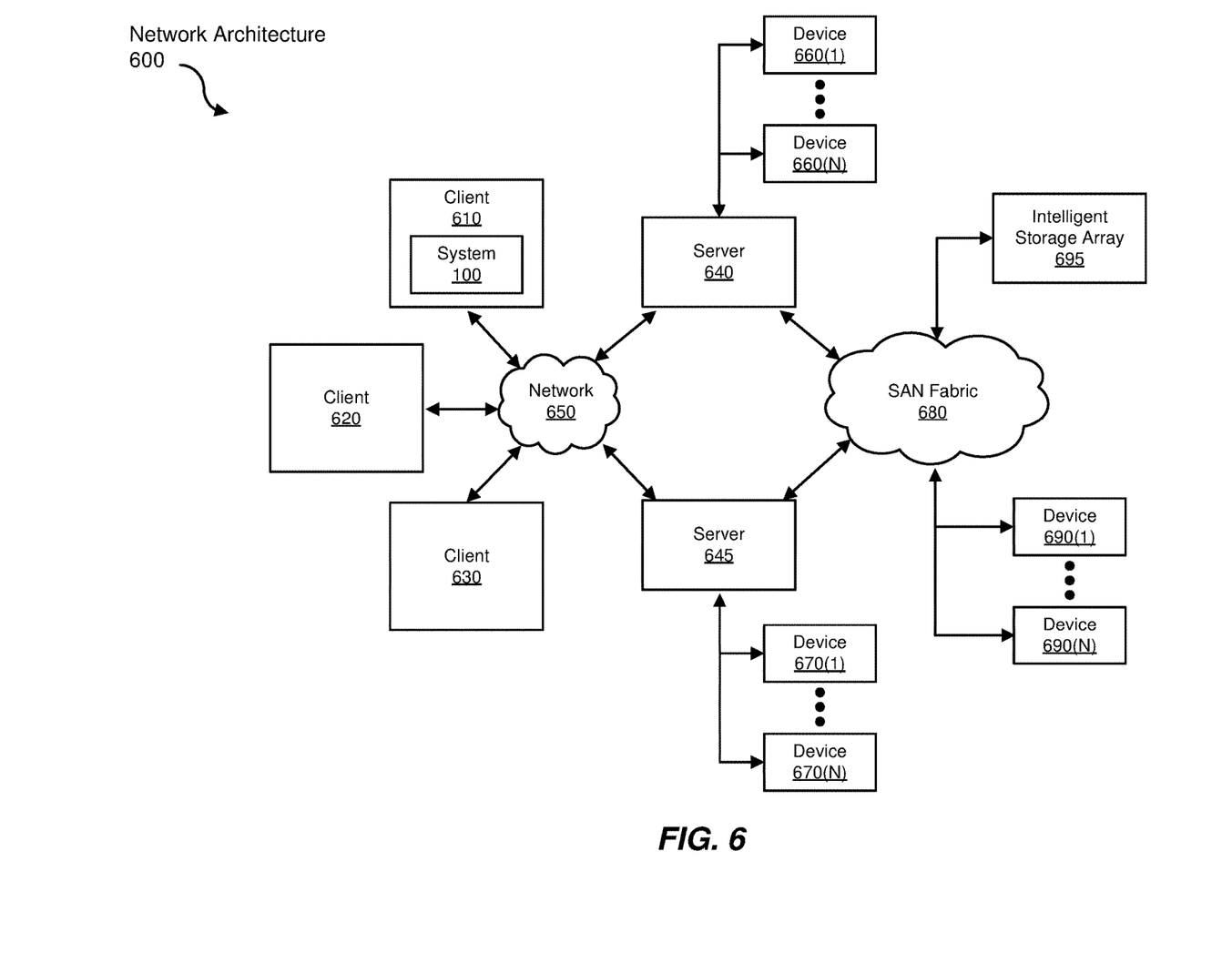
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for preventing loss of possession factors.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive information about user attributes and/or possession-factor attributes to be transformed, transform the information into a prediction of whether a possession factor of a user has become lost, output a result of the transformation to a security system, use the result of the transformation to notify the user about the possession factor having become lost, and store the result of the transformation to a storage system that stores information about the availability or unavailability of possession factors. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing loss of possession factors, at least a portion of the method being performed by a computing device comprising at least one processor, the method comprising:
   identifying an account of a user that is associated with a username, a password, and a possession factor that generates one-time-use passwords, wherein the username, the password, and a one-time-use password generated by the possession factor are used by the user to perform a multi-factor authentication procedure that is required when accessing the account of the user;
   monitoring an additional attribute of at least one of the user or the possession factor, the additional attribute comprising one of:
      an initial phone number that enables the possession factor to receive the one-time-use passwords;
      a cellular service that enables the possession factor to receive the one-time-use passwords;
      a physical location that enables the possession factor to connect to the cellular service and receive the one-time-use passwords;
      a physical address that enables the possession factor to connect to the cellular service and receive the one-time-use passwords; or
      an installation status of the possession factor that enables the possession factor to generate the one-time-use passwords;
   detecting, based at least in part on a change of the additional attribute, that the user is likely unable to use the possession factor to generate the one-time-use passwords; and
   performing, in response to detecting that the user is likely unable to use the possession factor to generate the one-time-use passwords, a security action to prevent the user from being unable to perform the multi-factor authentication procedure.

2. The computer-implemented method of claim 1, wherein:
   the account of the user is associated with an additional possession factor;
   either one of the possession factor and the additional possession factor can be used by the user to generate the one-time-use passwords; and
   the security action prevents the possession factor and the additional possession factor from becoming simultaneously lost.

3. The computer-implemented method of claim 2, wherein performing the security action comprises:
   notifying the user of the user's likely inability to use the possession factor to generate the one-time-use passwords; and
   instructing the user to:
      access the account of the user using the additional possession factor; and
      register a backup possession factor to replace the possession factor.

4. The computer-implemented method of claim 1, wherein:
   the possession factor comprises a mobile phone that was initially associated with the initial phone number;
   monitoring the additional attribute comprises monitoring, as part of an application installed on the mobile phone, a current phone number that is currently associated with the mobile phone; and
   detecting that the user is likely unable to use the possession factor to generate the one-time-use passwords comprises detecting that the current phone number is not the same as the initial phone number.

5. The computer-implemented method of claim 1, wherein:
   the possession factor comprises a mobile phone that was associated with the initial phone number;
   monitoring the additional attribute factor comprises monitoring, as part of an application installed on the mobile phone, the physical location of the mobile phone; and
   detecting that the user is likely unable to use the possession factor to generate the one-time-use passwords comprises detecting a change in the physical location of the mobile phone that indicates that the cellular service associated with the initial phone number has likely been lost.

6. The computer-implemented method of claim 1, wherein:
   the possession factor comprises a mobile phone that was initially associated with the initial phone number;
   monitoring the additional attribute comprises monitoring the physical address of the user; and
   detecting that the user is likely unable to use the possession factor to generate the one-time-use passwords comprises detecting a change in the physical address of the user that indicates that the cellular service associated with the initial phone number has likely been lost.

7. The computer-implemented method of claim 1, wherein:
   the possession factor comprises a mobile phone that was initially associated with the initial phone number;
   monitoring the additional attribute comprises monitoring a service status of the initial phone number; and
   detecting that the user is likely unable to use the possession factor to generate the one-time-use passwords comprises determining that the service status of the initial phone number indicates that the initial phone number has likely been lost.

8. The computer-implemented method of claim 1, wherein:
   the possession factor comprises a software token that was initially installed on a mobile device;
   monitoring the additional attribute comprises monitoring, as part of an application installed on the mobile device, whether the software token is still installed on the mobile device; and
   detecting that the user is likely unable to use the possession factor to generate the one-time-use passwords comprises determining that the software token is no longer installed on the mobile device.

9. The computer-implemented method of claim 1, wherein:
   the possession factor comprises a software token that was initially installed on a mobile device;
   monitoring the additional attribute comprises monitoring whether the software token is still installed on the mobile device by periodically sending push notifications to the software token; and
   detecting that the user is likely unable to use the possession factor to generate the one-time-use passwords comprises determining that the software token is no longer responding to the push notifications.

10. The computer-implemented method of claim 1, wherein:
monitoring the additional attribute further comprises monitoring a time period since the user last used the possession factor; and
detecting that the user is likely unable to use the possession factor to generate the one-time-use passwords further comprises determining that the time period has exceeded a predetermined threshold.

11. The computer-implemented method of claim 1, wherein detecting that the user is likely unable to use the possession factor to generate the one-time-use passwords comprises:
using one or more of the additional attributes to predict a loss score for the possession factor; and
determining that the loss score for the possession factor has exceeded a predetermined threshold.

12. The computer-implemented method of claim 1, wherein performing the security action comprises immediately notifying the user of the user's likely inability to use the possession factor to generate the one-time-use passwords.

13. The computer-implemented method of claim 1, wherein monitoring the additional attribute comprises monitoring the additional attribute of the possession factor that enables the possession factor to generate the one-time-use passwords.

14. The computer-implemented method of claim 1, wherein
the additional attribute comprises one of:
a physical address of the user; or
a physical location of the user.

15. A system for preventing loss of possession factors, the system comprising:
an identifying module, stored in memory, that identifies an account of a user that is associated with a username, a password, and a possession factor that generates one-time-use passwords, wherein the username, the password, and a one-time-use password generated by the possession factor are used by the user to perform a multi-factor authentication procedure that is required when accessing the account of the user;
a monitoring module, stored in memory, that monitors an additional attribute of at least one of the user or the possession factor, the additional attribute comprising one of:
an initial phone number that enables the possession factor to receive the one-time-use passwords;
a cellular service that enables the possession factor to receive the one-time-use passwords;
a physical location that enables the possession factor to connect to the cellular service and receive the one-time-use passwords;
a physical address that enables the possession factor to connect to the cellular service and receive the one-time-use passwords; or
an installation status of the possession factor that enables the possession factor to generate the one-time-use passwords;
a determining module, stored in memory, that detects, based at least in part on a change of the additional attribute, that the user is likely unable to use the possession factor to generate the one-time-use passwords;

a security module, stored in memory, that performs, in response to detecting that the user is likely unable to use the possession factor to generate the one-time-use passwords, a security action to prevent the user from being unable to perform the multi-factor authentication procedure; and
at least one physical processor that executes the identifying module, the monitoring module, the determining module, and the security module.

16. The system of claim 15, wherein:
the account of the user is associated with an additional possession factor;
either one of the possession factor and the additional possession factor can be used by the user to generate the one-time-use passwords; and
the security action prevents the possession factor and the additional possession factor from becoming simultaneously lost.

17. The system of claim 16, wherein the security module performs the security action by:
notifying the user of the user's likely inability to use the possession factor to generate the one-time-use passwords; and
instructing the user to:
access the account of the user using the additional possession factor; and
register a backup possession factor to replace the possession factor.

18. The system of claim 16, wherein the possession factor and the additional possession factor comprise at least two of:
a mobile phone;
a hardware token; and
a software token.

19. The system of claim 15, wherein the determining module detects that the user is likely unable to use the possession factor to generate the one-time-use passwords by:
using the additional attribute to predict a loss score for the possession factor; and
determining that the loss score for the possession factor has exceeded a predetermined threshold.

20. A non-transitory computer-readable medium comprising one or more computer-executable instructions that, when executed by at least one processor of a computing device, cause the computing device to:
identify an account of a user that is associated with a username, a password, and a possession factor that generates one-time-use passwords, wherein the username, the password, and a one-time-use password generated by the possession factor are used by the user to perform a multi-factor authentication procedure that is required when accessing the account of the user;
monitor an additional attribute of at least one of the user or the possession factor, the additional attribute comprising one of
an initial phone number that enables the possession factor to receive the one-time-use passwords;
a cellular service that enables the possession factor to receive the one-time-use passwords;
a physical location that enables the possession factor to connect to the cellular service and receive the one-time-use passwords;
a physical address that enables the possession factor to connect to the cellular service and receive the one-time-use passwords; or an installation status of the possession factor that enables the possession factor to generate the one-time-use passwords;

determine, based at least in part on a change of the additional attribute, that the user is likely unable to use the possession factor to generate the one-time-use passwords; and perform, in response to detecting that the user is likely unable to use the possession factor to generate the one-time-use passwords, a security action to prevent the user from being unable to perform the multi-factor authentication procedure.

\* \* \* \* \*

UNITED STATES PATENT AND TRADEMARK OFFICE
CERTIFICATE OF CORRECTION

Page 1 of 1

PATENT NO. : 10,616,214 B1
APPLICATION NO. : 15/346748
DATED : April 7, 2020
INVENTOR(S) : Kevin Jiang et al.

It is certified that error appears in the above-identified patent and that said Letters Patent is hereby corrected as shown below:

In the Claims

In Column 20, Line 15, Claim 5, delete "attribute factor" and insert -- attribute --, therefor.

In Column 21, Line 17 (approx.), Claim 11, delete "using one or more of" and insert -- using --, therefor.

Signed and Sealed this
Ninth Day of June, 2020

Andrei Iancu
*Director of the United States Patent and Trademark Office*